United States Patent Office 3,106,200
Patented Oct. 8, 1963

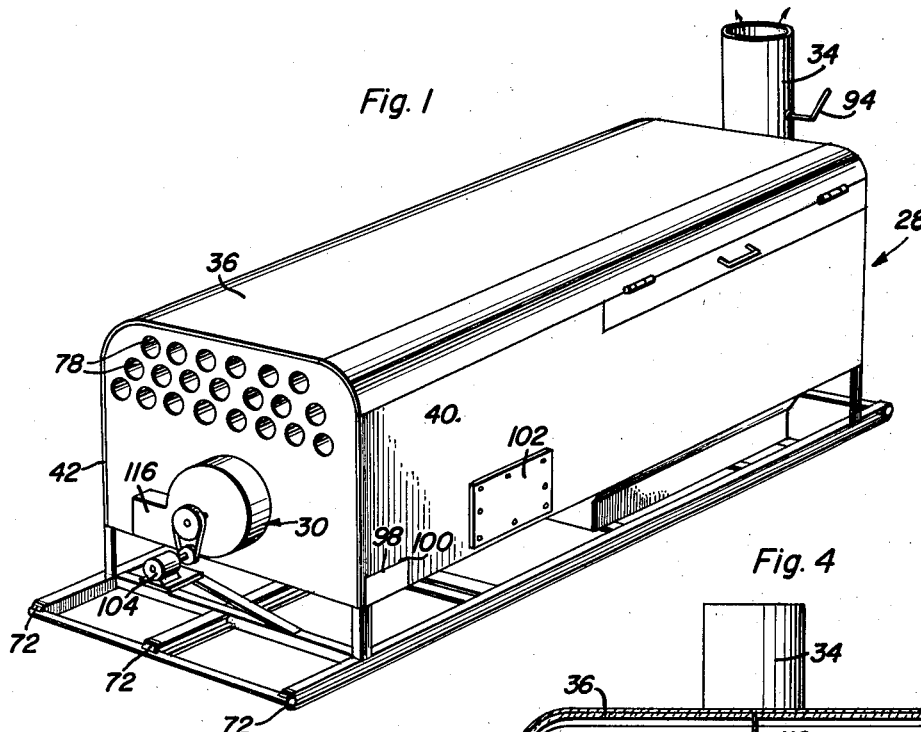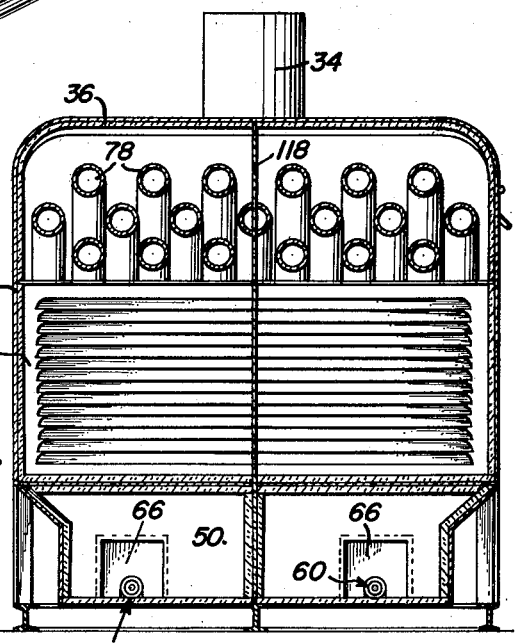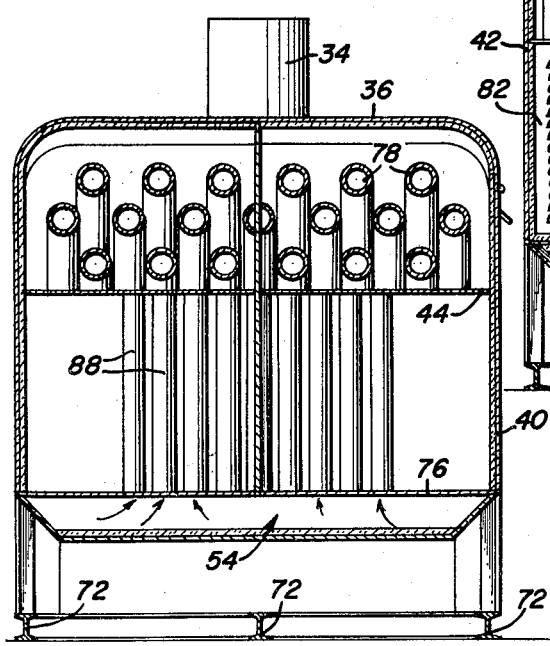

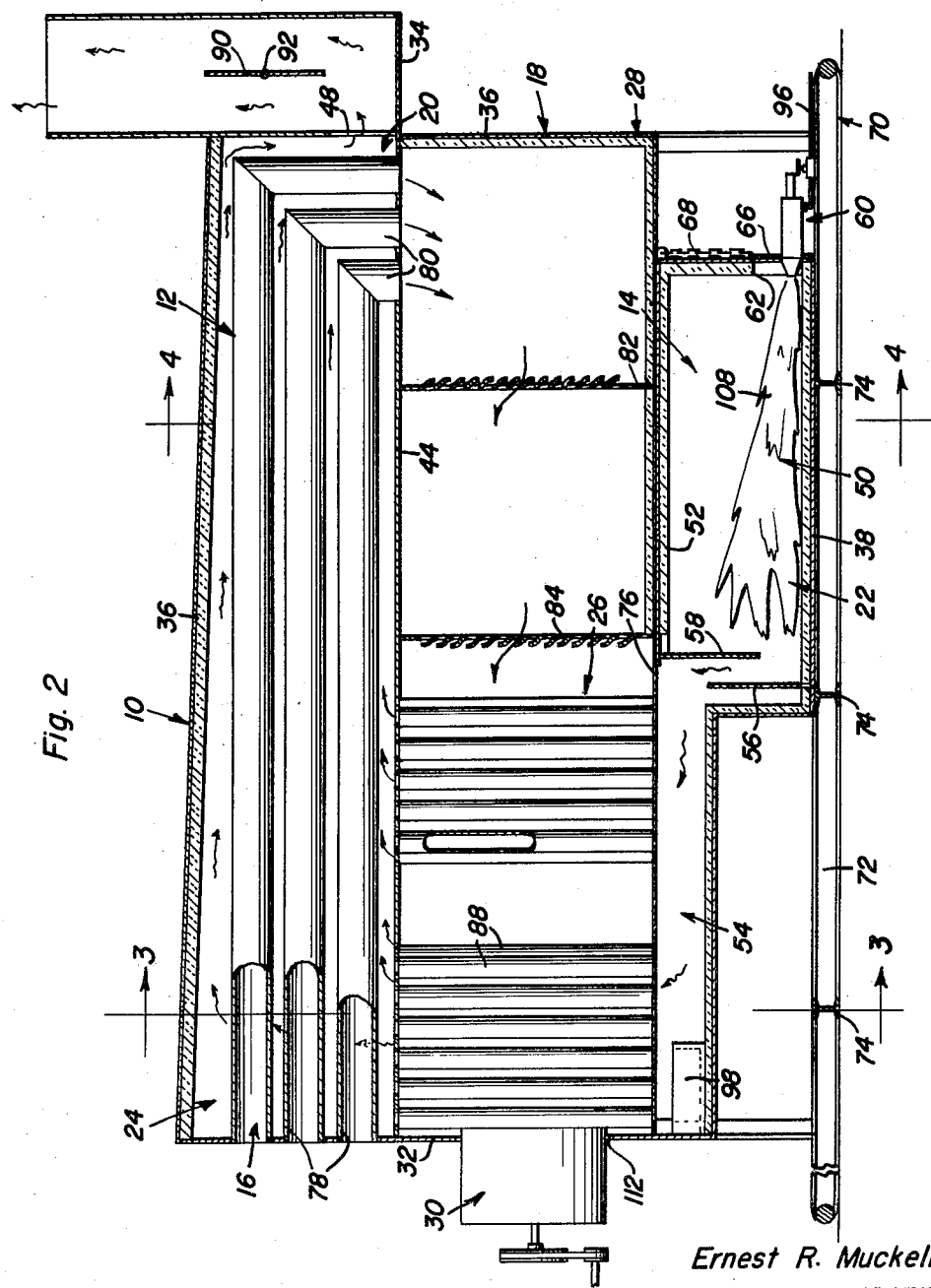

3,106,200
FUEL BURNING AIR HEATER
Ernest R. Muckelrath, Tioga, N. Dak., assignor to Air Heaters, Inc., Tioga, N. Dak., a corporation of North Dakota
Filed Oct. 12, 1961, Ser. No. 144,593
2 Claims. (Cl. 126—116)

This invention relates to a novel and useful air heater designed primarily as a heater for heating enclosures from the exterior thereof.

The air heater of the instant invention is designed with portability in mind and while being rigidly constructed is provided with skids whereby the heater may be slid over the ground.

The air heater has been constructed in a manner enabling it to be disposed exteriorly of an enclosure which is to be heated and is provided with blower means for forcing the heated air to the interior of the enclosure which is to be heated by means of suitable air ducts.

Inasmuch as the heater is designed for outdoor operation, it is to be understood that the exposed external surfaces thereof will be constructed of materials which resist the elements or will be suitably treated so as to resist corrosion by the elements.

The main object of this invention is to provide a heater which may be disposed outdoors and utilized to heat the interior of an enclosure. While it is sometimes desirable to heat certain enclosures, such an enclosure is not always provided with entrance means whereby a relatively large and high capacity heater may be placed therein. In addition, if a heater using combustible fuel as a source of heat is disposed interiorly of an enclosure, flue means must be provided and passed through a portion of the enclosure. As some enclosures are not provided with openings through which flue pipes and the like may pass, the air heater of the instant invention is very well suited for heating this type of enclosure inasmuch as the exhaust from the combustion may be readily dissipated into the ambient atmosphere.

A further object of this invention, in accordance with the immediately preceding object, is to provide an air heater including tortuous fresh air and combustion products passage means with portions of each of the passage means being disposed in good heat transfer relation with portions of the other air passage means.

Another object of this invention is to provide an air heater in accordance with the peceding objects which is constructed in a most compact manner and has a configuration adapting the air heater to be readily handled and transported from one location to another.

A still further object of this invention is to provide an air heater which offers a pleasing appearance.

Still another object of this invention is to provide an air heater having fresh air passage means so constructed that the air which is to be discharged therefrom for heating purposes first passes in good heat transfer relation with a portion of the combustion products passage means immediately adjacent the discharge end of the heated air passage means.

Still another object of this invention is to provide an air heater in accordance with the preceding objects whose component parts are arranged in such a manner so that each is easily accessible.

A further object of this invention is to provide an air heater including fresh air passage means having an inlet and an outlet and with a blower assembly communicated with the outlet end thereof whereby the blower will draw air through the fresh air passage means rather than blowing the air through the fresh air passage means thus eliminating the build-up of static air pressure within the air passage means.

A final object to be specifically enumerated herein is to provide an air heater in accordance with the preceding objects which will conform to conventional forms of manufacture, be of simple construction and easy to use so as to provide a device that will be economically feasible, long lasing and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the air heater;
FIGURE 2 is an enlarged longitudinal vertical sectional view of the air heater;
FIGURE 3 is a transverse vertical sectional view of the air heater taken substantially upon the plane indicated by the section line 3—3 of FIGURE 2; and
FIGURE 4 is a transverse vertical sectional view taken substantially upon the plane indicated by the section line 4—4 of FIGURE 2.

Referring now more specifically to the drawings the numeral 10 generally designates the air heater of the instant invention. The air heater 10 includes fresh air passage means generally referred to by the reference numeral 12 and combustion products passage means generally referred to by the reference numeral 14. The fresh air passage means 12 includes an inlet leg generally referred to by the reference numeral 16, an outlet leg generally referred to by the reference numeral 18 and a bight portion generally referred to by the reference numeral 20 which communicates the outlet end of the inlet leg 13 and the inlet end of the outlet leg 18.

The combustion products passage means generally referred to by the reference numeral 14 includes an inlet leg generally referred to by the reference numeral 22, an outlet leg generally referred to by the reference numeral 24 and a bight portion generally referred to by the reference numeral 26 which communicates the outlet end of the inlet leg 22 and the inlet end of the outlet leg 24. It will further be noted from FIGURE 2 of the drawings that each of the combustion products passage means 12 and 14 is generally U-shaped and that both combustion products passage means 12 and 14 are disposed in an upstanding plane which extends longitudinally of the heater 10.

The heater 10 includes a housing generally referred to by the reference numeral 28 and it will be noted that a blower assembly generally referred to by the reference numeral 30 is carried by the front wall 32 of the housing 28 and that a flue pipe 34 is carried by the rear wall 36 of the housing 28. The housing 28 also includes a top wall 36, a bottom wall 38 and opposite side walls 40 and 42.

An upper dividing wall 44 extends between the side walls 40 and 42 and is spaced a distance below the top wall 36 and defines between the upper divider wall 44 and the top wall 36, the outlet leg of the combustion products passage means generally referred to by the reference numeral 14. An outlet opening 48 communicates the outlet end of the outlet leg 24 with the inlet end of the flue pipe 34 and it will be noted that the inlet end of the inlet leg 22 comprises a firebox generally referred to by the reference numeral 50 which is lined with any suitable insulation material such as fire clay 52. The outlet end of the inlet leg 22 comprises a manifold chamber generally referred to by the reference numeral 54 and a plurality of baffle plates 56 and 58 are disposed between the outlet of the firebox 50 and the inlet of the manifold chamber 54.

A plurality of burner assemblies generally referred to by the reference numerals 60 and of any convenient type are each disposed in a burner opening 62 formed in the inlet end of the inlet leg 22 and a draft door 66 is suspended by means of a chain 68 adjacent each burner assembly 60 and for varying the effective area of the corresponding burner opening 62.

The housing 28 rests on a skid assembly generally referred to by the reference numeral 70 and including three longitudinal runners 72 which are interconnected by means of transverse brace members 74.

A lower divider wall 76 is disposed between the upper divider wall 44 and the bottom wall 38 and defines the outlet leg 18 of the fresh air passage means 12. A plurality of tubes 78 have their inlet ends opening through the portion of the front wall 32 alined with the outlet leg 24 and the tubes 78 extend rearwardly to the rear or outlet end of the outlet leg 24 and terminate in downwardly directed end portions 80 which open through the upper divider wall 44 and into the inlet end of the outlet leg 18 of the fresh air passage means 12. A pair of louver panels 82 and 84 for distributing the fresh air being heated uniformly across the outlet leg 18 are disposed in the inlet end of the outlet leg 18 and it will be noted that the bight portion 26 comprises a plurality of fire tubes 88 whose opposite ends open through the upper and lower divider walls 44 and 76 to communicate the outlet end of the inlet leg 22 with the inlet end of the outlet leg 24.

The flue pipe 34 has a damper 90 pivotally mounted therein by means of damper shaft 92 which projects outwardly of the flue pipe and is provided with a handle portion 94. The burner assemblies 60 may be of any conventional type such as a gas type burner and provided with suitable fuel lines 96.

It will be noted that the inlet end of the outlet leg 24 is larger than the outlet end thereof and defines a gathering for the combustion products passage means 14.

It will be noted that a thawing compartment drawer 98 may be removably secured in the inlet leg 22 through an opening 100 formed in the side wall 40 and it will be noted that this drawer may be utilized to thaw pipe sections or pieces of equipment as desired. In addition, it will be noted that the fire tubes 88 are arranged in two groups of tubes which are spaced longitudinally of the housing 28. An access door 102 is secured over an opening (not shown) formed in the side wall 40 and the space between the groups of fire tubes 88 is in direct transverse alinement with the opening covered by the access door 102. Accordingly, the access door 102 may be removed for access to the fire tubes 88 for repairs.

The top wall 36 and the opposite side walls 40 and 42 may be removably secured to the other portions of the housing 28 if desired.

The blower assembly 30 is driven by any suitable source of power such as an electric motor 104 although it is to be understood that the blower assembly 30 may be driven by means of an internal combustion engine if the heater 10 is disposed in a location which does not have access to a suitable source of electrical potential.

In operation, the burner assemblies 60 may be utilized to create a fire 108 in the firebox 50 and the draft doors 66 may be adjusted as desired. Accordingly, air will be drawn in through the draft or burner door opening 62 and the combustion products will pass the baffle plates 56 and 58 and into the manifold chamber 54. The combustion products will then pass up through the fire tubes 88 in good heat exchange relation with the fresh air being discharged from the outlet leg 18 of the fresh air passage means 12. Then, the combustion products are discharged from the upper ends of the fire tubes 88 and into the outlet leg 24 of the combustion products passage means 14 whereupon they ultimately pass through the outlet opening 48 and into the flue pipe 34. However, it will be noted that the fresh air inlet tubes 78 pass longitudinally through the outlet leg 24 of the combustion products passage means 14 and accordingly, the incoming fresh air is disposed in good heat transfer relation with the products of combustion just before it passes into the flue pipe 34. Then, the incoming fresh air enters the laterally directed end portions 80 of the inlet tubes 78 and passes into the inlet end of the outlet leg 18 of the fresh air passage means 12. The partially heated fresh air will then pass through the louver plates 82 and 84 and into the outlet end of the outlet leg 18 and pass in good heat exchange relationship with the combustion products passing through the fire tubes 88. Inasmuch as the blower assembly 30 is disposed in the outlet opening 112 of the outlet leg 18, the air to be heated is drawn through the fresh air passage means 12 and not pushed through the fresh air passage means 12 thereby eliminating the build-up of static pressure within the fresh air passage means 12.

It will be noted that the outlet legs 18 and 24 are disposed in good heat transfer relationship with each other by means of the upper dividing wall 44 and that at least the outlet end of the inlet leg 22 is disposed in good heat transfer relationship with the outlet end of the outlet leg 18 by means of the lower dividing wall 76. In addition, the fresh air passage means 12 and combustion product passage means 14 of the heater 10 are intermingled with each other in such a manner so as to provide a very compact heater and one which is uniform in configuration and offers a pleasing appearance.

It may be seen from FIGURE 1 of the drawings that the blower assembly 30 includes an outlet neck portion 116 and it is to be noted that any suitable form of air conduit means may be secured to the discharge end of the outlet portion 116 for conducting the heated air being exhausted from the blower assembly 30 into the interior of the enclosure which is to be heated.

From FIGURE 4 of the drawings it will be noted that the interior of the heater 10 is divided into two equal halves by means of longitudinal upstanding dividing wall 118. The divider wall 118 extends the entire length of the heater 10 within the housing 28 and accordingly, it may be observed that only one of the burner assemblies 60 need operate at any given time if individual burner assembly operation is desired. In this case, a damper plate and the like is utilized to close off the outlet end of the outlet leg 18 in the half of the heater 10 which is not being used.

Thus it may be seen that the heater 10 may be disposed exteriorly of an enclosure and conveniently utilized to heat the interior of the latter as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An air heater comprising an elongated horizontally disposed hollow housing including front and rear walls interconnected by means of opposite side walls, a top wall and a bottom wall, a pair of vertically spaced and longitudinally extending divider walls constructed of heat conductive material interconnected between said front, rear and opposite side walls and spaced vertically from said top and bottom walls defining first, second and third vertically stacked and immediately adjacent compartments extending longitudinally of said housing between said bottom wall and the lower divider wall, said upper and lower divider walls, and said upper divider wall and top wall respectively, said first and third compartments defining the parallel legs of a generally U-shaped combustion products passage means including a heat exchange and passage defining means extending transversely through the forward end of said second compartment communicating the corresponding ends of said legs of said combustion products passage means, second compartment and heat exchange and passage defining means disposed in and extending longitudinally of said third compartment defining with said second compartment the parallel legs of a generally U-shaped fresh air heating passage means including passage defining means extending downwardly adjacent the rear end of said housing and communicating the corresponding ends of said second compartment and said longitudinally extending passage means, the forward ends of said second compartment and said longitudinally extending passage means opening outwardly of said housing through the front wall thereof and the rear ends of said first and third compartments opening outwardly through the rear wall of said housing, burner means disposed in the rear end of said first compartment supplying hot products of combustion thereto and air pump means communicating with the forward end of said second compartment for drawing air through said fresh air heating passage means.

2. The combination of claim 1 wherein said transversely extending heat exchange and passage defining means comprises a plurality of air tubes extending through the front end of said second compartment and opening at their opposite ends into the front ends of said first and third compartments and said longitudinally extending heat exchange and passage defining means comprises a plurality of air tubes extending longitudinally of said third compartment opening through said front wall at their forward ends and terminating in laterally directed end portions at the rear ends which open through the upper divider wall and into the rear end of said second compartment.

References Cited in the file of this patent
UNITED STATES PATENTS

| | | |
|---|---|---|
| 162,436 | Wallis | Apr. 20, 1875 |
| 1,814,011 | Snow | July 14, 1931 |
| 2,073,674 | Brendt | Mar. 16, 1937 |
| 2,553,168 | Boyer | May 15, 1951 |
| 2,891,535 | Frey | June 23, 1959 |